(12) United States Patent
Coers et al.

(10) Patent No.: US 6,951,514 B1
(45) Date of Patent: Oct. 4, 2005

(54) THROUGHPUT CONTROL FOR COMBINES USING FEEDERHOUSE SIGNAL

(75) Inventors: Bruce Alan Coers, Hillsdale, IL (US); Daniel James Burke, Cordova, IL (US); William F. Cooper, Fargo, ND (US); Jerry Dean Littke, Hillsboro, ND (US); Karl-Heinz Mertins, Davenport, IA (US)

(73) Assignee: Deere & Company, Moline, IL (US)

( * ) Notice: Subject to any disclaimer, the term of this patent is extended or adjusted under 35 U.S.C. 154(b) by 1016 days.

(21) Appl. No.: 09/813,264

(22) Filed: Mar. 20, 2001

(51) Int. Cl.[7] .............................................. A01D 75/18
(52) U.S. Cl. ............................ 460/1; 460/6; 56/10.2 R
(58) Field of Search ........................ 56/10.2 B, 10.2 C, 56/10.2 E, 11.1, 11.2, 10.2 R, 10.8, DIG. 15; 460/1, 2, 3, 4, 5, 6, 7

(56) References Cited

U.S. PATENT DOCUMENTS

| | | | |
|---|---|---|---|
| 3,073,099 A | 1/1963 | Andersen ........................ 56/20 |
| 3,093,946 A | 6/1963 | Pitt et al. ........................ 56/20 |
| 3,138,908 A | 6/1964 | Budzich ........................ 56/20 |
| 3,481,122 A | 12/1969 | Pool et al. ..................... 56/21 |
| 3,514,929 A | 6/1970 | Cornish et al. ................ 56/21 |
| 3,546,860 A | 12/1970 | Pool et al. ..................... 56/21 |
| 3,574,307 A | * 4/1971 | Theobald ...................... 460/4 |
| 3,609,947 A | * 10/1971 | Herbsthofer .................. 460/6 |
| 3,897,677 A | * 8/1975 | Phoenix et al. ........... 56/10.2 R |
| 4,130,980 A | * 12/1978 | Fardal et al. ............. 56/10.2 F |
| 4,138,837 A | * 2/1979 | Love .............................. 56/11.2 |
| 4,430,847 A | * 2/1984 | Tourdot et al. .............. 56/10.7 |
| 4,458,471 A | 7/1984 | Herwig ........................ 56/10.2 |
| 4,487,002 A | 12/1984 | Kruse et al. ................. 56/10.2 |
| 4,893,241 A | 1/1990 | Girodat et al. ......... 364/424.07 |
| 4,934,985 A | 6/1990 | Strubbe ........................ 460/4 |
| 4,967,544 A | * 11/1990 | Ziegler et al. ........... 56/10.2 R |
| 5,488,817 A | 2/1996 | Paquet et al. ................ 56/10.2 |
| 5,855,108 A | 1/1999 | Salz et al. .................... 56/10.2 |
| 6,036,597 A | 3/2000 | Arner ............................. 460/6 |
| 6,185,990 B1 | 2/2001 | Missotten et al. ............. 73/73 |
| 6,213,870 B1 | * 4/2001 | Satzler ........................... 460/6 |

FOREIGN PATENT DOCUMENTS

| | | |
|---|---|---|
| DE | 43 11 054 | 10/1994 |
| DE | 199 03 471 | 6/2000 |
| JP | 5 207 813 A22 | 8/1993 |

* cited by examiner

*Primary Examiner*—Robert E. Pezzuto
*Assistant Examiner*—Árpád F Kovács

(57) ABSTRACT

An agricultural combine having a supporting structure that is driven by ground engaging wheels at a harvesting speed by a propulsion assembly. The combine is also provided with crop processing assemblies for processing a harvested crop. A feederhouse directs the harvested crop material to the crop processing assemblies. A feederhouse force sensor senses the force exerted by the harvested crop material as it passes through the feederhouse. The feederhouse force signal is directly related to crop throughput. An operator control in the operator's cab of the combine provides a loss rate signal that is also directed to the electronic controller. The electronic controller converts the loss rate signal into a desired feederhouse force signal. The electronic controller regulates the forward speed or harvesting speed of the combine so that the desired feederhouse force signal is equal to the actual feederhouse force signal. The harvesting speed regulation can be modified or overridden by moisture signals from a moisture sensor located in the feederhouse for sensing the moisture content of harvested crop.

13 Claims, 2 Drawing Sheets

THROUGHPUT CONTROL FOR COMBINES USING FEEDERHOUSE SIGNAL

BACKGROUND OF THE INVENTION

1. Field of the Invention

The present invention is directed to a throughput control system for an agricultural combine wherein the upward force on the forward drum of the feederhouse is measured and is used to control the harvesting speed of the combine.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

A harvesting assembly located at the front of the combine harvests the crop. The harvested crop is directed to a feederhouse for delivering the harvested crop material to a threshing assembly. The threshing assembly may either be a conventional transverse threshing cylinder and concave, or a rotary threshing assembly. The rotary threshing assembly may be arranged axially or transversely. The forward harvesting speed of the combine controls the amount of harvested crop material ingested by the threshing assembly.

The feederhouse comprises a housing that is pivotally mounted to the front of the combine and from which the harvesting assembly is mounted. The interior of the feederhouse is provided with a conveyor for conveying the harvested crop material upwardly and rearwardly into the combine. Typically the conveyor is a chain conveyor having transversely extending slats located between the drive chains. A rear mounted drive sprocket drives the drive chains. The chains pass around a front mounted drum, which floats on top of the harvested crop material. When the front drum has floated to its maximum upward position the harvested crop material exerts an upward force on the front drum.

Various throughput control systems have been proposed to facilitate combine efficiency. Some of these systems sense grain loss using grain loss monitors. Other systems sense crop material throughput and try to maintain a relatively constant throughput of crop material. The earlier the throughput of crop material the better the control system can function. In one proposed method, sensors on the harvesting platform are used to signal throughput before the crop is harvested, see U.S. Pat. No. 4,228,636.

SUMMARY

It is an object of the present invention to provide a simple and effective throughput control system for an agricultural combine by correlating upward force on the front drum of the feederhouse with crop throughput.

An agricultural combine having a supporting structure is driven by ground engaging wheels at a harvesting speed by a propulsion assembly. Harvested crop material is taken into the combine through a feederhouse. A feederhouse force sensor monitors the force of the harvested crop material moving through the feederhouse. In a chain type feederhouse the force sensor is attached to the front drum and measures the upward force the harvested crop material exerts on the front drum. For a chain conveyor, the feederhouse force sensor may comprise two sensors. A first force sensor comprises a potentiometer for measuring the position of the front drum relative to the feederhouse housing and a second sensor measuring the upward force on the front drum when the front drum is in its maximum upward position. This feederhouse force signal is related to the harvested material throughput and provides a throughput signal to an electronic controller. An operator control in the operator's cab of the combine provides a loss rate signal that is also directed to the electronic controller. The electronic controller converts the loss rate signal into a desired throughput signal. The electronic controller regulates the forward speed (harvesting speed) of the combine so that the desired throughput signal is equal to the actual throughput signal calculated from the feederhouse force signal.

A further refinement to the throughput control system is the use of a moisture sensor on the feederhouse to measure the moisture content of harvested crop material as it passes through the feederhouse. The moisture signal is directed to the electronic controller and can be used to modify the desired throughput signal or the actual throughput signal, to thereby modify the harvesting speed of the combine.

Cumulatively or alternatively the moisture signal can be used to immediately change the speed of the combine if the moisture signal falls outside certain preset limits or the moisture is dramatically changed from previous moisture readings. For example, if the combine is entering a green weedy patch in the field, the moisture sensor would signal high moisture crop material, the controller in turn would immediately slow down the combine to better accommodate this heavy load. Similarly, as the combine passes out of this weedy patch the controller would automatically speed up the combine as the combine enters more normal crop conditions. As stated above, the moisture signal can be used to simply modify one of the throughput signals and/or be used against moisture set points to override the normal throughput control.

DETAILED DESCRIPTION

Figure 1:
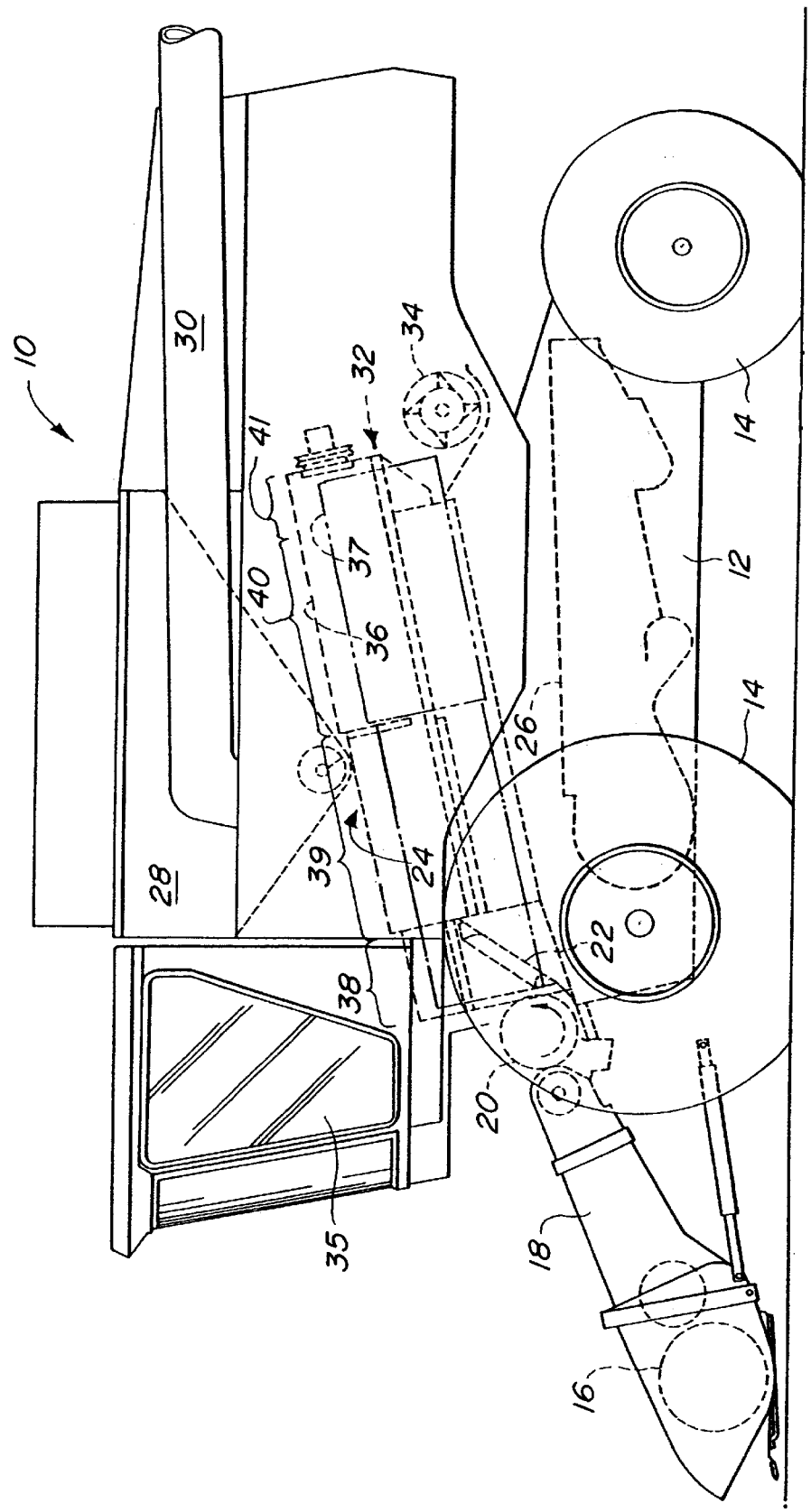
FIG. 1 is a semi-schematic side view of an agricultural combine.

FIG. 1 shows an agricultural combine 10 comprising a supporting structure 12 having ground engaging wheels 14 extending from the supporting structure. Although the combine is illustrated as having wheels it could also have ground engaging tracks, either full tracks or half tracks. A harvesting platform 16 is used for harvesting a crop and directing it to a feederhouse 18. The feederhouse 18 contains a conveyor for conveying the harvested crop to a beater 20. The beater 20 directs the crop upwardly through an inlet transition section 22 to a rotary threshing and separating assembly 24. The illustrated threshing and separating assembly 24 is axially arranged in the combine 10, however, it could be in other orientations relative to the longitudinal axis of the combine. Although the present invention is described and illustrated as being used on a rotary threshing and separating assembly, it can also be used on a combine having a conventional transverse threshing cylinder and concave assembly.

The rotary threshing and separating assembly 24 threshes and separates the harvested crop material. Grain and chaff fall through grates on the bottom of the assembly 24 to a cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. It should be noted that the discharge beater 34 could also discharge crop material other than grain directly to a straw chopper. The operation of the combine is controlled from operator's cab 35.

The rotary threshing and separating assembly 24 comprises a cylindrical rotor housing 36 and a rotor 37 located inside the housing 36. The front part of the rotor and the rotor housing define the infeed section 38. Downstream from the infeed section 38 are the threshing section 39, the separating section 40 and the discharge section 41. The rotor 37 in the infeed section 38 is provided with a conical rotor drum having helical infeed elements for engaging harvested crop material received from the beater 20 and inlet transition section 22. Immediately downstream from the infeed section 38 is the threshing section 39. In the threshing section 39 the rotor 37 comprises a cylindrical rotor drum having a number of threshing elements for threshing the harvested crop material received from the infeed section 38. Downstream from the threshing section 39 is the separating section 40 wherein the grain trapped in the threshed crop material is released and falls through a floor grate in the rotor housing 36 to the cleaning system 28. The separating section merges into a discharge section 41 where crop material other than grain is expelled from the rotary threshing and separating assembly 24.

The front wheels 14 of the combine 10 are driven by a hydrostatic transmission 50. The hydrostatic transmission 50 is driven in a conventional manner by an internal combustion engine, not shown. The hydrostatic transmission in turn drives a gear box 52. Two live axles 54 extend outwardly from the gear box 52 and drive final drives 56 of the front wheels 14. The hydrostatic transmission 50 comprises a pump unit and a motor unit. The pump unit and/or the motor unit are provided with adjustable swash plates. The adjustable swash plates control the output speed of the transmission and its direction of rotation. Solenoid control valves control the positions of the swash plates. The steerable rear wheels 14 can also be driven by wheel motors directly mounted to the wheels. The speed of the wheel motors can be controlled by the throughput control system discussed below.

Figure 2:
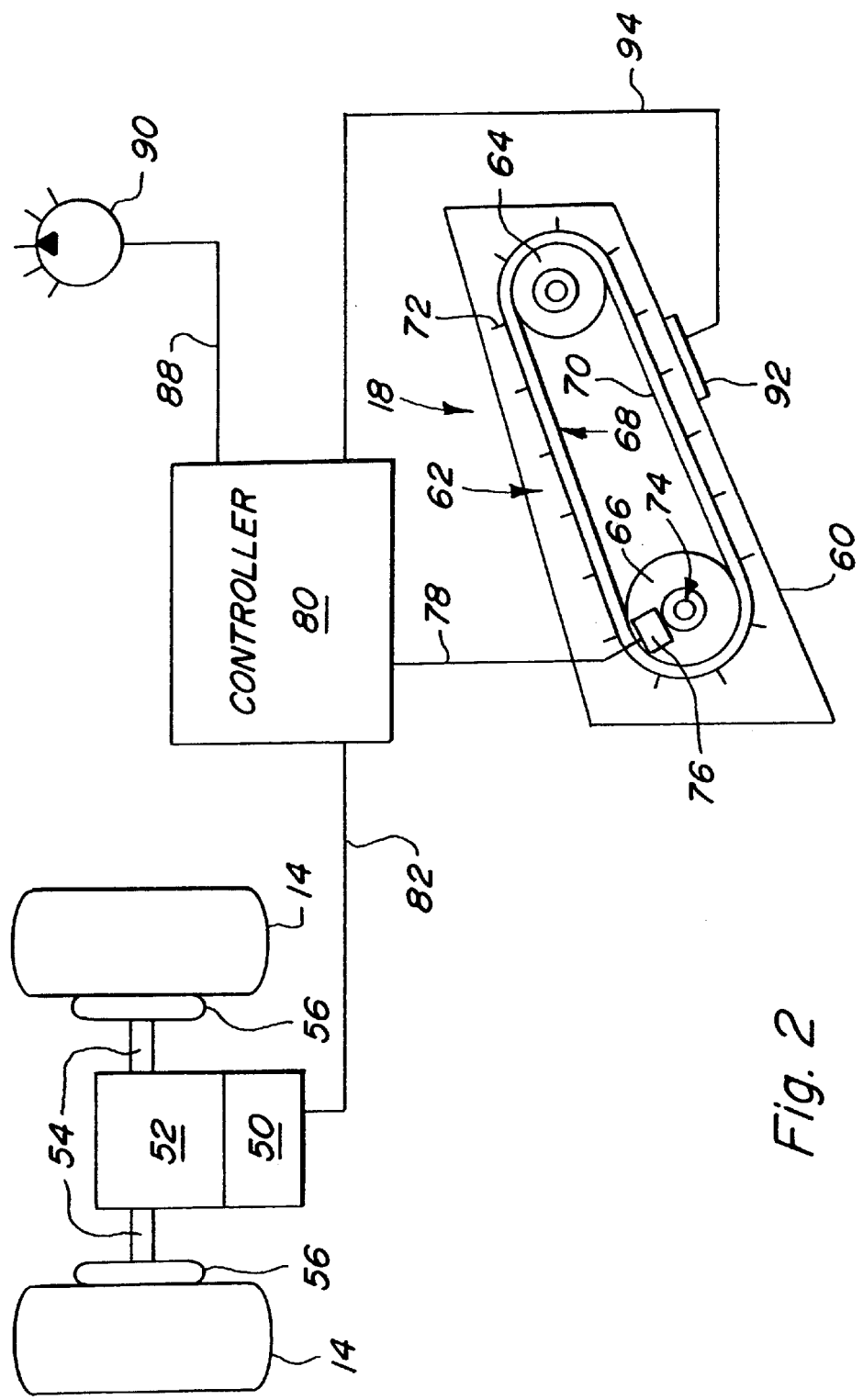
FIG. 2 is a schematic of the throughput control system of the present invention.

As shown in FIG. 2, the feederhouse 18 comprises a housing 60 having a chain conveyor 62 located therein. The conveyor comprises a rear drive sprocket 64 and a front drum 66 around which a chain conveyor 68 is positioned. The chain conveyor comprises at least two longitudinally arranged chains 70 having transversely extending slats 72 attached thereto. The front drum is provided with an axle 74. The front axle 74 is free to float up and down in the housing 60 to a limited degree. The front drum 66 is provided with a feederhouse force sensor 76 that is in communication with electronic controller 80 through line 78.

Because of the floating nature of the front drum, the feederhouse force sensor comprises two sensors. The first sensor comprises a potentiometer that measures the location of the front drum 66 relative to the housing 60. The upward displacement of the front drum 66 indicates the force exerted by the harvested crop material on the front drum as the harvested crop material must overcome a portion of the weight of the conveyor 62. When the front drum 66 reaches its maximum upward position a second sensor is used to measure the feederhouse force as the position of the front drum 66 does not change relative to the housing 62. This second sensor is a force sensor that measures the upward force exerted by the harvested crop on the front drum 66 through axle 74. The feederhouse force signal generated by sensor 76 is directly related to the harvested material throughput passing through the feederhouse and therefore it represents the actual throughput of crop material into the combine.

Although the present invention is described and illustrated as being used on a chain conveyor feederhouse, to which it is well suited, it can also be used on feederhouses having multiple transverse beaters or longitudinally arranged augers. The key feature of the present invention is using a feederhouse force signal generated by the harvested crop material passing through the feederhouse and relating that to throughput. In a transverse beater feederhouse, the upward force applied to the axles of the beaters could measure the feederhouse force signal. In a longitudinally arranged auger feederhouse, the force exerted against the auger troughs by the harvested crop material could measure the feederhouse force signal.

An electronic controller 80 controls the harvesting speed of the combine 10. That is, the electronic controller 80 regulates the forward speed (harvesting speed) of the combine by regulating the position of the swash plates of the hydrostatic transmission by controlling the operation of the solenoid control valves though line 82. The controller 80 receives a feederhouse pressure signal through line 78 from force sensor 76. Crop material throughput is related to harvesting loss rates. The controller 80 also receives a desired loss rate signal through line 88 from switch 90. Switch 90 is located in the operator's cab 35.

In operating the throughput control system, the operator selects a desired loss rate on switch 90. The controller 80 receives this loss rate signal and converts it into a desired throughput signal. The controller 80 also receives the actual throughput from the sensor 76. The controller 80 regulates the forward speed of the combine so that the desired hydraulic pressure signal is equal to the actual pressure signal.

As a further refinement to the system, the feederhouse 18 is provided with a moisture sensor 92 that is in communication with the controller 80 through line 94. The moisture sensor 92 senses moisture in the harvested crop passing through the feederhouse. The moisture signal can be used to modify the actual throughput signal or the desired throughput signal to slow the combine as it encounters high moisture harvested crop.

Together with the signal modification, discussed above, or as an alternative to the signal modification, the moisture sensor signal may be used to directly regulate the harvesting speed of the agricultural combine. If the crop moisture level of the harvested crop is greater than a specified amount, the combine will be slowed by a specified amount. For example, if the combine encounters a weedy green crop material, the moisture sensor 92 will sense increased moisture. The moisture signal will be directed through line 94 to controller 80. The controller 80 receiving this signal will first determine if the crop moisture is above a specified amount, and if it is, the controller will immediately slow down the combine.

The present invention should not be limited by the above-described embodiments, but should be limited solely by the claims that follow.

We claim:

1. An agricultural combine for harvesting, threshing and separating an agricultural crop, the agricultural combine comprising:
   a supporting structure;
   ground engaging means for propelling the supporting structure at a harvesting speed;
   crop processing assemblies located in the supporting structure;
   a feederhouse is mounted to the supporting structure for directing a harvested crop to the crop processing assemblies, the feederhouse having a front drum with a maximum upward position;
   a feederhouse force sensor is coupled to the feederhouse for sensing the force exerted by the harvested crop on the feederhouse as the harvested crop is directed through the feederhouse, the feederhouse force sensor comprising a first sensor for measuring upward displacement of the front drum below the maximum upward position of the front drum and a second sensor for measuring the upward force exerted on the front drum by a harvested crop when the maximum upward position is reached by the front drum, the feederhouse force sensor providing an actual feederhouse force signal;
   a controller for adjusting the harvesting speed of the ground engaging means in response to the actual feederhouse force signal sensed by the feederhouse force sensor.

2. An agricultural combine as defined by claim 1 further comprising an operator control for controlling a loss rate of the combine, the operator control providing a loss rate signal to the controller.

3. An agricultural combine as defined by claim 2 wherein the controller converts the loss rate signal into a desired feederhouse force signal that together with the actual feederhouse force signal regulates the harvesting speed of the ground engaging means.

4. An agricultural combine as defined by claim 3 wherein the feederhouse is provided with a moisture sensor for sensing the moisture of a harvested crop passing through the feederhouse, the moisture sensor providing a moisture signal to the controller.

5. An agricultural combine as defined by claim 4 wherein the controller uses the moisture signal to modify the desired feederhouse force signal.

6. An agricultural combine as defined by claim 4 wherein the controller uses the moisture signal to modify the actual feederhouse force signal.

7. An agricultural combine as defined by claim 4 wherein the controller uses the moisture signal to directly regulate harvesting speed.

8. An agricultural combine as defined by claim 5 wherein the controller uses the moisture signal to directly regulate harvesting speed.

9. An agricultural combine as defined by claim 6 wherein the controller uses the moisture signal to directly regulate harvesting speed.

10. An agricultural combine for harvesting, threshing and separating an agricultural crop, the agricultural combine comprising:
    a supporting structure;
    ground engaging means for propelling the supporting structure at a harvesting speed;
    crop processing assemblies located in the supporting structure;
    a feederhouse is mounted to the supporting structure for directing a harvested crop to the crop processing assemblies;
    a feederhouse force sensor is coupled to the feederhouse for sensing the force exerted by the harvested crop on the feederhouse as the harvested crop is directed through the feederhouse, the feederhouse force sensor providing an actual feederhouse force signal;
    a moisture sensor is coupled to the feederhouse for sensing the moisture of a harvested crop passing through the feederhouse, the moisture sensor providing a moisture signal to the controller;
    a controller for adjusting the harvesting speed of the ground engaging means in response to the actual feederhouse force signal sensed by the feederhouse force sensor.

11. An agricultural combine as defined by claim 10 wherein the controller uses the moisture signal to modify a desired feederhouse force signal.

12. An agricultural combine as defined by claim 10 wherein the controller uses the moisture signal to modify the actual feederhouse force signal.

13. An agricultural combine as defined by claim 10 wherein the controller uses the moisture signal to directly regulate harvesting speed.

* * * * *